United States Patent [19] [11] 3,784,081
Karmann et al. [45] Jan. 8, 1974

[54] APPARATUS FOR AND WELDING OF TAPERED PIPE

[75] Inventors: Thomas R. Karmann, Omaha; Alton A. Adams, Arlington, both of Nebr.

[73] Assignee: Valmont Industries, Inc., Valley, Nebr.

[22] Filed: Mar. 20, 1972

[21] Appl. No.: 236,007

[52] U.S. Cl............... 228/17, 29/477, 219/8.5, 219/59, 228/15, 228/47, 228/48
[51] Int. Cl............................................. B23k 1/20
[58] Field of Search ............. 228/15, 17, 44, 47, 228/49, 48; 29/475, 477, 477.7; 219/8.5, 59

[56] References Cited
UNITED STATES PATENTS

| | | | |
|---|---|---|---|
| 3,148,262 | 9/1964 | Hughes | 219/59 X |
| 3,329,329 | 7/1967 | Karmann | 228/17 |
| 3,431,383 | 3/1969 | Ullery, Jr. et al. | 219/59 |
| 3,452,424 | 7/1969 | Morris | 228/17 X |
| 3,648,008 | 3/1972 | Kawato et al. | 219/59 X |

Primary Examiner—Robert D. Baldwin
Assistant Examiner—Robert J. Craig
Attorney—H. Robert Henderson et al.

[57] ABSTRACT

An apparatus capable of receiving a tapered tube having a straight, open seam, forcing and guiding the tube in a seam aligned condition into a welding station where the tube is then drawn through the welding station by the application of frictional pressure upon opposite external sides thereof, the guiding and alignment of the tube as it is being welded aided by a torque unit applied to the emerging end thereof, the torque unit capable of rotating the tube about its longitudinal axis as it is being longitudinally moved and welded; and with a hydraulic system capable of applying appropriate pressure to the sides of the tube-ever increasing in diameter, to aid in maintaining the open seam at a proper dimension for thermal-electric welding, and capable further of automatically decreasing the pressure at a predetermined distance from the butt end of the tube for the same reason, the apparatus capable of automatically completing the weld, ejecting the welded tube, and resetting itself for receiving and processing another tube for welding thereof.

5 Claims, 15 Drawing Figures

APPARATUS FOR AND WELDING OF TAPERED PIPE

BACKGROUND OF THE INVENTION

This invention relates to the welding of tapered tubes of up to approximately fifty feet, and to the apparatus for and method of welding the straight, open seam of the tube.

This invention is an improvement over the disclosure in this art of U. S. Pat. No. 3,329,329 patented July 4, 1967 by Thomas R. Karmann and entitled Welding Tapered Pipe. Although the invention of that patent was a substantial improvement over the prior art, use thereof showed the need for several areas of improvement.

When necessary to adapt the apparatus to a tube having a different taper from one being previously welded, it was found most difficult to remove and replace the profile tube gripping plates.

It was found that the use of a mechanical application of force upon the laterally movable feed wheel to maintain proper spacing between the feed wheels was not completely satisfactory to accommodate the ever increasing diameter of the tapered tube, and also to accommodate the inherent tendency of the butt end of the tube to close the seam at that end.

It was also found that the use of a unitary pressure wheel for engagement with the just-welded area of the pipe was not completely satisfactory, that the open seam edges needed individual pressure treatment for proper horizontal alignment just prior to being welded.

Although the prior art patent made provision to guide the tube as it approached the welding station, it was found that this arrangement was not completely satisfactory, such that improved horizontal and rotational control of the tube was necessary.

SUMMARY OF THE INVENTION

The tapered tube welding apparatus of the invention comprises an input conveyor unit for receiving a tapered tube to be welded, the tube having an open, straight seam; a positioning unit for guiding the tube with the seam in a vertical plane into a tube feed wheel assembly comprising a pair of wheels each having a plurality of plates with the ever changing profile of the tube formed therein for drawing the tube beneath another tube seam guide unit and a high frequency welding unit, the wheels having removable segments of said plates for different tapers; a hydraulic system for controlling the pressure of one of the wheels against the tube and toward the other wheel as they are rotated, to accommodate the ever changing diameter of the tube; and a tube withdrawing unit which simultaneously aids withdrawal and guidance of the tube for effective welding control on the exit side of the feed wheel assembly.

It is an object of this invention to provide an improved apparatus for and method of welding a tapered tube.

It is another object of this invention to provide a new and novel tube guiding and positioning unit on the input side of the apparatus.

It is yet another object of this invention to provide a new and novel tube feed wheel arrangement for maintaining an appropriate lateral pressure on a tube as it is being drawn through the welding station.

Another object of this invention is to provide an improved feed wheel structure whereby varying the profile of the feed plates is expedited.

Yet another object of this invention is the provision of novel structure at the welding station for individually and selectively applying vertical pressure to the free seam edges for horizontally aligning them prior to welding.

Still another object is the provision of a device for rotating the tube about its longitudinal axis as it emerges from the welding station, for the purpose of keeping the open seam aligned with the welding station electrodes, the rotating device operable with or without the input positioning and guiding unit.

It is another object of this invention to provide a device for withdrawing the welded tube from the welding station while simultaneously operating the rotating device, if necessary.

These objects, and other features and advantages of this invention will be readily apparent upon reference to the following description and the accompanying drawings.

DESCRIPTION OF THE PREFERRED EMBODIMENT

GENERAL ARRANGEMENT

Figure 1:
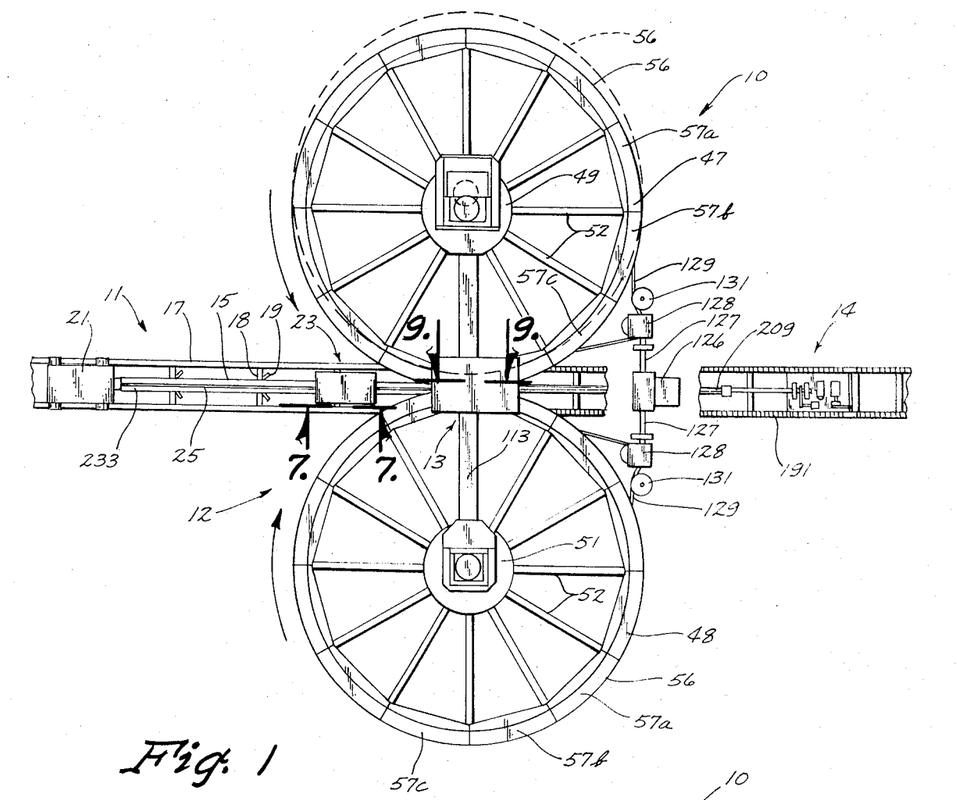
FIG. 1 is a plan view of the preferred embodiment according to this invention.
Figure 2:
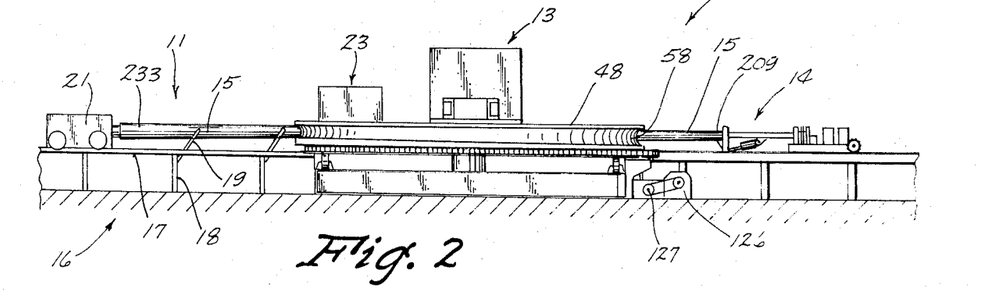
FIG. 2 is a side elevational view of the apparatus of FIG. 1.
Figure 3:
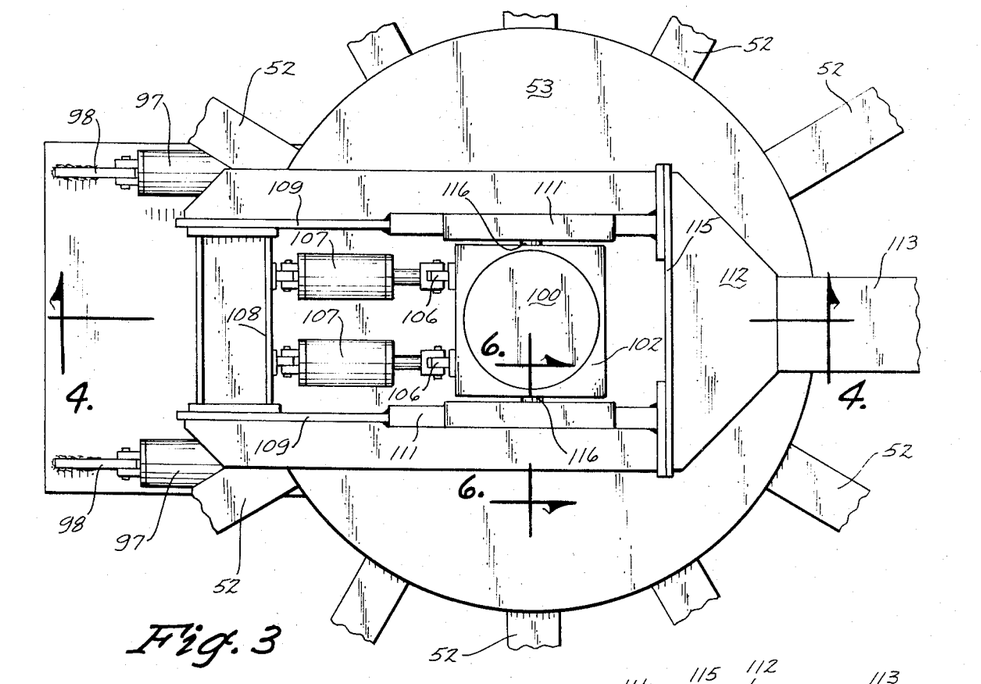
FIG. 3 is an enlarged, fragmentary plan view of the center of one of the wheel assemblies.
Figure 4:
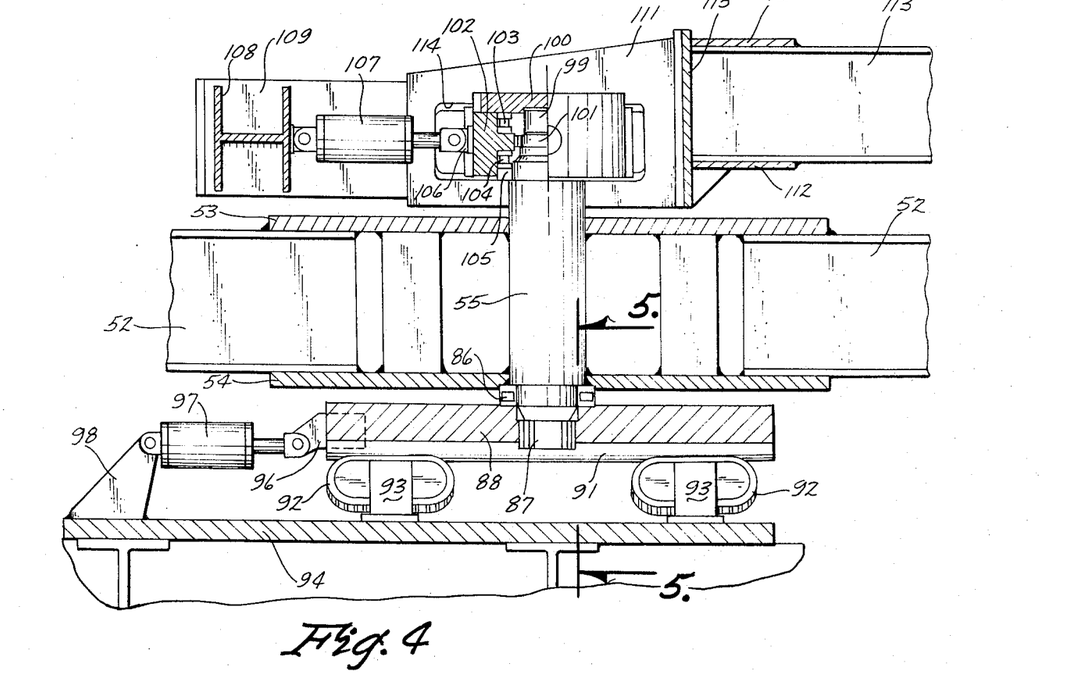
FIG. 4 is a vertical sectional view taken along the line 4—4 in FIG. 3.

Referring now to the drawings, and particularly FIG. 1, the preferred embodiment of the tapered pipe welding apparatus of this invention is indicated generally at 10. The apparatus 10 comprises generally a tube input assembly 11, a tube feed wheel assembly 12, a tube welding assembly 13, and a tube withdrawing assembly 14. Basically, these assemblies 11–14 inclusive, operate to receive an elongated tapered tube 15 from a hydraulicly operated, mechanical tube forming apparatus wherein a flat piece of metal, formed in the shape of a trapezoid, is received, formed its entire length in a cylindrical shape by a cold rolling process, wherein a straight seam 25 extending the entire length of the tube is left open. Upon receiving this tapered tube 15, the input assembly 11 feeds the tube 15 into a feed wheel assembly 12 which proceeds to draw the tube 15 through a welding assembly 13 which electrically welds the seam 25 closed in a continuous manner. Subsequent to and during the welding, the tube withdrawing assembly 14 extracts the tube 15 from the welding assembly 13 for further processing. A more detailed description of the assemblies 11-14 and the process follows.

TUBE

The tapered tube 15, which is used primarily as a light pole after processing subsequent to the process described herein, is either of carbon steel, stainless steel, or aluminum. The equipment has welded carbon steel from 3 through 11 gauge, stainless steel from 3 through 14 gauge, and aluminum of 10 gauge. The length varies from approximately 12' to 50'.

TUBE INPUT ASSEMBLY

The tube input assembly 11 comprises an elongated input conveyor unit 16 which includes a pair of parallel tracks 17 supported above a floor level by supports 18, and upon which a plurality of Y-shaped cradles 19 are pivotally mounted for nesting the tube 15 centrally of the tracks 17.

A wheeled entry cart 21 is rollably mounted on the tracks 17 and is provided with an electric reversible motor (not shown) controlled by micro switches (not shown) mounted on one of the tracks 17. With the cradles 19 in a depressed position, the cart 21 is operable to force the tube 15 toward the feed wheel assembly 12 where it is subsequently gripped by the wheel assembly 12 and drawn through the welding assembly 13.

Figure 7:
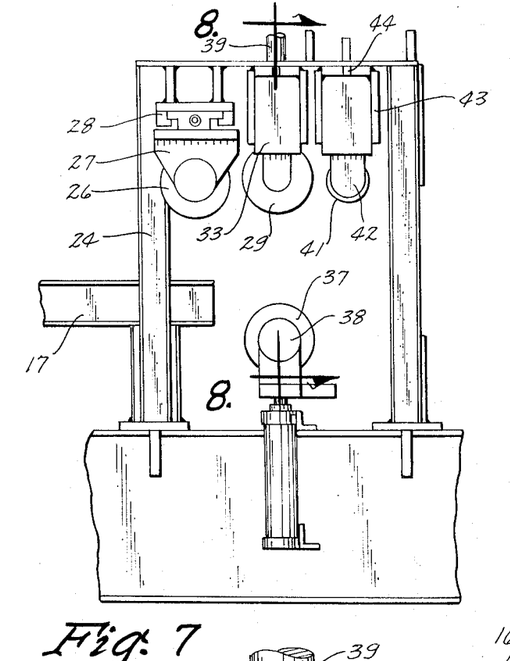
FIG. 7 is an enlarged, fragmentary side elevational view taken along the line 7—7 in FIG. 1.
Figure 8:
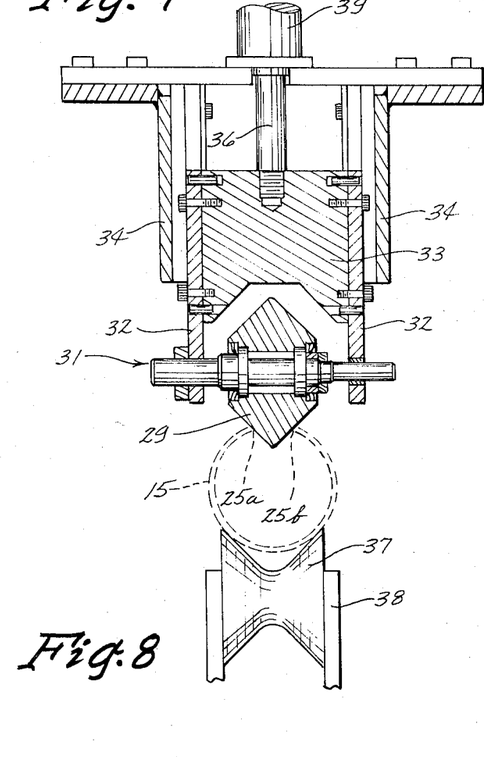
FIG. 8 is an enlarged vertical sectional view taken along the line 8—8 in FIG. 7.

The input assembly 15 includes further an input tube positioning control unit 23 (see FIG. 7) which includes a stand 24 mounted to extend above the tracks 17. The control unit 23 includes a trio of devices which position and guide the tube 15 as it is passed from the input conveyor 16 to the feed wheel assembly 12. These comprise a narrow V-roll 26 which is adapted to extend longitudinally into the seam 25 and between the seam edges 25a and 25b (FIG. 8). The roll 26 is mounted on a block 27 which in turn is laterally movable by appropriate means on a guideway 28. By this arrangement, the V-roll 26 is adapted to move the tube 15 arcuately about its longitudinal axis for aligning it with certain parts of the welding assembly 13.

For additional guidance of the tube 15, a wide V-roll or guide 29 (FIGS. 7 and 8) is provided for engaging the seam edges 25a and 25b and extending into the seam 25, guide 29 operating in conjunction with a rotatable hourglass roll 37 arranged directly below on a mounting 38. The guide 29 is mounted on a shaft device 31 the outer ends of which are inserted in a pair of parallel plates 32 secured to and depending from a block 33 movable in a pair of guides 34 by a piston 36 which is part of a hydraulic cylinder unit 39. In use, the guide 29, being vertically movable, can separate the edges 25a and 25b where they are too close together, or it can prevent the tube 15 from wobbling if the seam 25 is too loose. Again, the purpose of the guide 29 is as with the V-roll 26, to properly align the tube 15 for the welding assembly 13.

The control unit 23 is completed by the provision of a flat roll 41 (FIG. 7) which serves in conjunction with the hourglass roll 37 to maintain the tube against tilting up or down in a vertical plane as it is passed through the control unit. The roll 41 is secured to a mounting 42 which in turn is secured to a vertically movable guide 43, with the provision of an adjusting member 44 for locating the placement of the mounting 42. In effect, the roll 41 serves to maintain the upper surface of the tube 15 at a constant level.

It will be noted that the longitudinal axes of the V-roll 26, the guide 29, the roll 41, and the hourglass roll 37 are all perpendicular to the longitudinal axis and the direction of movement of the tube 15.

FEED WHEEL ASSEMBLY

The feed wheel assembly 12 is illustrated generally in FIGS. 1-4 and 10, and comprises a pair of wheels 47 and 48 each of which rotates in a horizontal plane about a vertical pivot. The wheel 47 (FIG. 1) is movable laterally relative to the stationary wheel 48 for purposes of adjusting the spacing therebetween for handling different size tubes 15, and for maintaining pressure on a tube 15 as it is being welded to obtain the best weld. Each wheel 47 and 48 is placed upon a mounting platform 49 and 51, respectively. With the mounting of the stationary wheel 48 being of a conventional nature, only the laterally movable wheel 47 and its mounting platform 49 will be described. Like parts with respect to the wheel 48 and its platform 51 are shown by like reference numerals.

The wheel 47 includes a plurality of elongated I-beams 52 extended radially from connection to a pair of flat upper and lower center plates 53 and 54 (FIG. 4), and with an axel 55 extended vertically through and secured to the plates at the centers thereof. The peripheral surface 56 (FIG. 1) of the wheel 47 is comprised of a plurality of arcuate segments 57a, 57b, 57c, etc., arranged in a contiguous manner with each segment including a multitude of flat, tube gripper plates 58 (FIGS. 9 and 10) secured together in a vertical, side-by-side relationship, and with each plate having a semi-circularly formed profile 59 formed in the outer exposed edge thereof. At the outer ends of the beams 52, each pair of adjacent I-beams 52 are interconnected by a vertical end plate 61 (FIG. 10) with an inwardly extending horizontal flange 61a, and a vertical connector plate 62 spaced inwardly from the plate 61.

Bearing in mind that the tube 15 is formed of a progressively increasing cross-section area from one end to the other, the work profiles 59 of the gripper plates 58 are successively larger so that they will also be able to accommodate and grip such a configuration. Moreover, it is desirable to have the upper most extent of the tube 15, where the edges 25a and 25b (FIG. 8) are located, at a constant elevation. The work engaging profiles 59 of the gripper plates 58 are successively enlarged in the manner shown, for example in FIG. 9 wherein a first plate 58 has a profile 59a, with the next plate having a profile 59b slightly larger than the profile of 59a, and so on around the circumference until the cutout portion 59x of the final gripper plate 58 would be immediately adjacent 59a. The outer edge 60 (FIG. 10) of each gripper plate 58 is vertical up to the cutout or profile portion 59; however, the profile portions do not define complete semicircles in view of the fact that the feed wheels are slightly spaced apart. In each of the gripper plates, the work engaging profile begins at the bottom. Thus, it will be appreciated that as the tube is fed between these profiles 59, the upper surface of the tube remains at a constant elevation with the differences in size being accommodated below this constant elevation.

With these feed wheels 47 and 48 in cooperative relationship, two opposed plates 58 define gripping surfaces for the tube 15 as it is moved there between, and the tube is thereby bent or compressed to its final shape in preparation of the welding operation at the welding assembly station 13.

Figures 5, 6, 9:
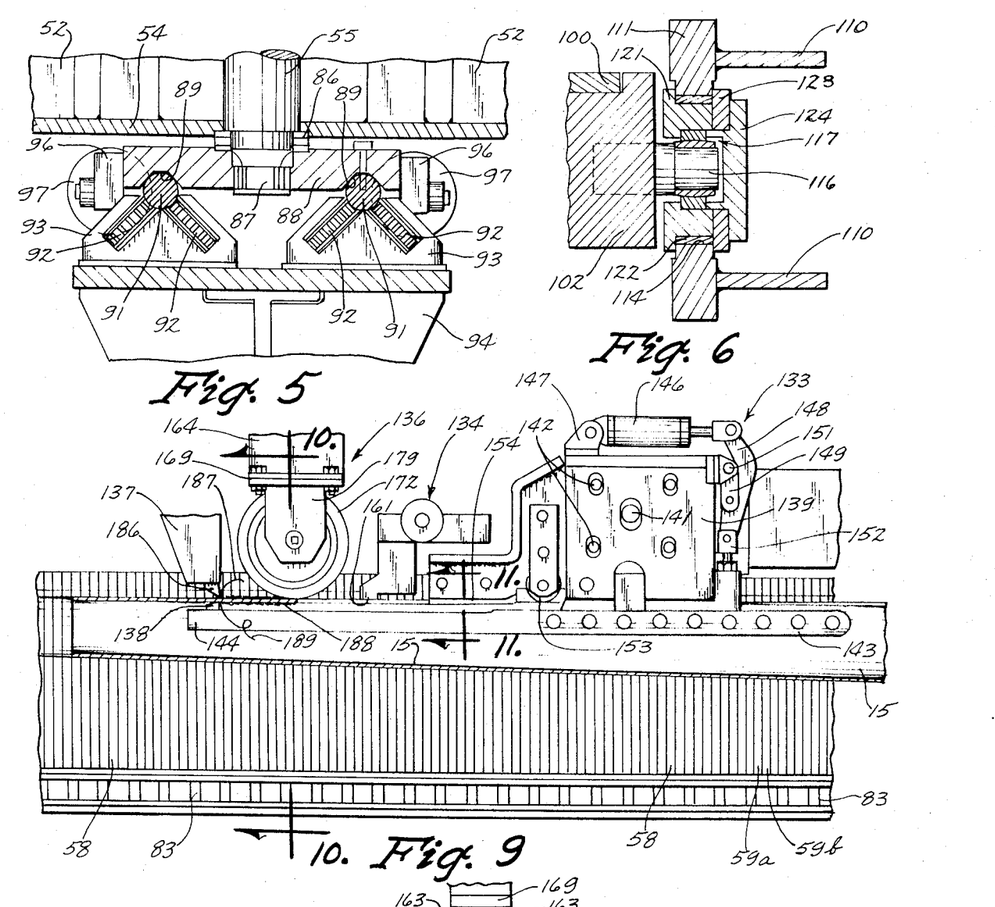
FIG. 5 is a fragmentary vertical elevational view taken along the line 5—5 in FIG. 4.
FIG. 6 is an enlarged, fragmentary view taken along the line 6—6 in FIG. 3.
FIG. 9 is an enlarged, fragmentary, sectional veiw as taken along the line 9—9 in FIG. 1.
Figure 10:
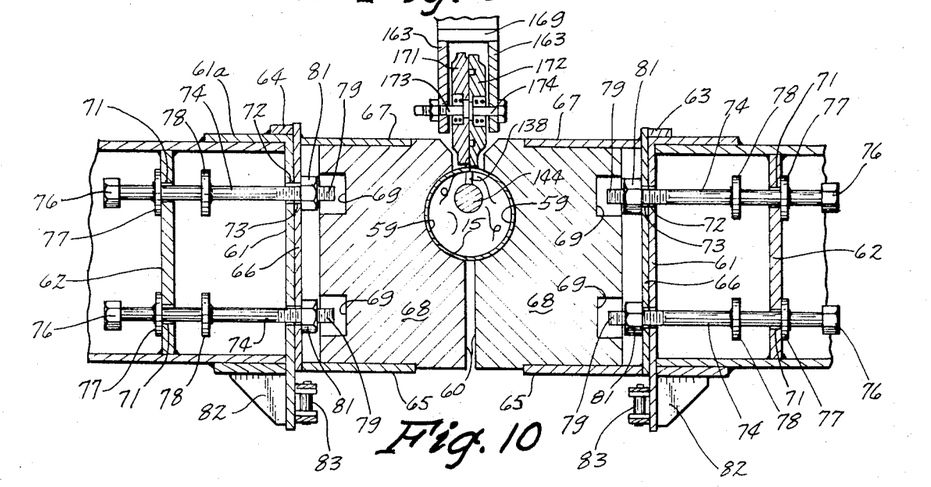
FIG. 10 is a sectional view taken along the line 10—10 in FIG. 9.

Each segment 57 includes a vertical backplate 66, a top horizontal plate 67 and a bottom horizontal plate 65, all of which form a U-shaped housing to receive a plurality of tube gripper plates 68, arranged and welded together in the side-by-side relationship illustrated in FIGS. 9 and 10.

Cutouts 69 are formed in the inner portions of the gripper plates 58, and are aligned with openings 71, 72 and 73 in the vertical elements as best illustrated in FIG. 10 for receiving pairs of connectors 74, for fastening a segment 57 to an end plate 61. Each fastener includes a headnut 76 on one end for rotation purposes, a pair of longitudinal spaced lands 77 and 78 on either side of the connector plates 62 for limiting the axial movement of the connector, and with a threaded end 79 rotatable into a nut 81 which is welded to the outer side of the backplate 66. By this arrangement, a group of gripper plates 58 forming a segment 57 can be easily removed and replaced by another segment which has a different profile, thus enabling the wheel 47 to be easily adapted to feed tubes of varying dimensions.

Each segment 57 is properly connected to a respective end plate 61 by a pair of keys 63 secured in spaced relation to the flange 61a for receiving therebetween another key 64 secured to the backplate 66. At the bottom end of each end plate 61, a gusset structure 82 is provided for strengthening said end, and a sprocket 83 is mounted on the outside of the lower portion of the end plates 61 for rotational purposes of the wheel 47 as described more in detail hereinafter.

At the center of the wheel 47, the lower portion of the axle 55 is rotatably mounted in a thrust bearing 86 and a radial bearing 87, with the latter mounted in turn in a block 88. Running radially beneath the block 88 in a parallel manner are a pair of bars 89 and 91 which are slideably movable on a quartet of bearings 92 (FIG. 5) each disposed in an angular manner within a mounting block 93, and with the two mounting blocks 93 being disposed upon a base 94. These are anti-friction, recirculating linear roller bearings designed for use on round ways such as the bass 89 and 91.

At the outer end of the block 88, a pair of ears 96 are provided for attachment to the piston end of a double acting hydraulic cylinder 97 (see FIG. 3), and with each cylinder 97 being pivotally connected to the upper end of an anchor 98 in turn secured to the base 94.

The upper end 99 of the wheel axle 55 is journaled in a radial bearing 101 and is covered by a circular cap 100, with a mounting block 102 being rotatable about the bearing 101 within a pair of vertically spaced thrust bearings 103 and 104. Bearing 104 sets upon a spacer ring 105. The outer end of the block 102 has a pair of laterally spaced ears 106 each of which is connected to a double acting cylinder 107, with the outer ends of the cylinders 107 being pivotally connected to an H-beam 108.

Extending forwardly from the H-beam are a pair of parallel, vertically disposed side plates 109 which are joined to extensions 111 in turn connected to the end plate 115 of a beam connector 113 which extends between the platforms 49 and 51 of the two wheels 47 and 48 (see FIG. 1). Upper and lower plates 112 (FIG. 4) complete the connection of the beam end to the plate 115.

Each side extension 111 has a rectangular opening 114 (FIG. 4) formed therein into which a side extended trunnion 116 of the mounting block 102 extends for rotation within a spacer bearing unit 117. The unit 117 rotates within a rectangular slide 121 within a pair of bronze waylines 122. A retainer 123 is secured to the slide 121, and a bearing retainer 124 is mounted to the retainer 123 to complete the slide arrangement. By this arrangement, simultaneous hydraulically actuated operation of the two pairs of cylinders 97 and 107 effect a radial movement of the axle 55 of the wheel 47 either toward or away from the other wheel 48.

Rotation is imparted to the two wheels 47 and 48 by a hydraulic drive motor 126 (FIGS. 1 and 2) which operates via jack shafts 127 a pair of gear reducers 128 for rotating a pair of chains 129 entrained about the sprockets 83 (FIG. 10) of the two wheels. A chain tightener 131 (FIG. 1) is provided for each chain 129 for maintaining the proper tension thereon.

TUBE WELDING ASSEMBLY

The tube welding assembly 13 comprises a slitter bar unit 133 (FIG. 9), a Thermatool welding machine 134, a press wheel unit 136, an exterior scarfing tool 137, and an interior scarfing tool 138. These units are all aligned longitudinally with each other and with the tube 15 to be welded, and are disposed between the wheels 47 and 48 as partially shown in FIGS. 9 and 10.

The slitter bar unit 133 includes a housing 139 mounted for lateral movement by an adjusting screw 141, and pivotal in a vertical plane about a pivot 142. Secured to the base of the housing is an elongated support 143 at the forward end 144 of which is mounted the interior scarfing tool 138. Raising and lowering of the support 143 is achieved by articulated linkage which includes a hydraulic cylinder 146 pivotally connected to an ear 147, connected to a link 148 pivotally connected by another link 149 to an ear 151 on the housing 139, and also pivotally connected to an ear 152 adjustably mounted on the support 143.

At the front of the housing 139 is mounted a flat press roll 153 which is vertically adjustable for maintaining the top edges 25a and 25b of the tube in a constant plane. And extended still further to the front of the housing 139 are a pair of elongated, insulated slitter bars 154 and 156 (FIG. 11), mounted on either side of a plate 157, and having a pair of identical extensions 158 and 159 for maintaining the seam edges 25a and 25b spaced apart an appropriate distance for high resistance welding purposes.

The welding machine 134 is a high frequency machine, e.g., manufactured by Thermatol Machine Company of Rochelle, N. Y., and has the usual electrodes shoes 161 (only one showing) which are adapted to be positioned directly above the tube 15 and each seam edge 25a and 25b. Only but a very small part of the welding machine 134 is shown in FIG. 9.

Figure 12:
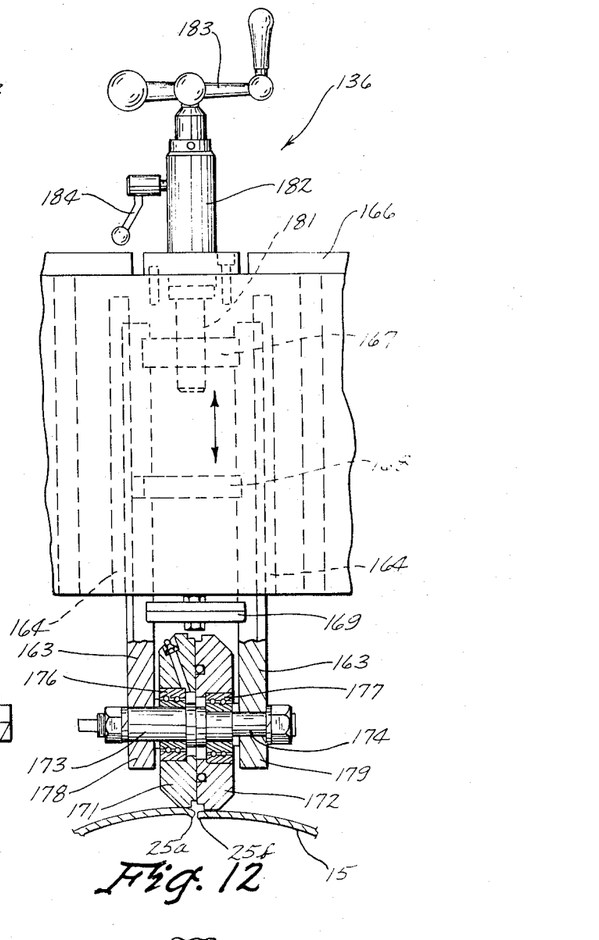
FIG. 12 is an enlarged, view, partly in section, of the press wheel apparatus of this invention.

The press wheel unit 136 (FIGS. 9 and 12) includes a pair of parallel, upstanding side plates 163 mounted for vertical sliding movement in a pair of guides 164 secured to a frame 166. The plates 163 are spaced apart by spacer bar groups 167, 168, and 169 with the lower group 169 providing for longitudinal adjustment of a pair of steel, round press wheels 171 and 172. The wheels, identical, are mounted on separate axles 173 and 174, flanged at the inner ends for holding thrust bearings 176 and 177, with each axle secured to a depending mounting plate 178 and 179.

One of the axles 174 is an eccentric-type axle such that its wheel 172 can be vertically adjusted relative to the other wheel 171. Thus, should one seam edge 25a or 25b be bent slightly different from the other, the capability of the press wheels being set at different heights can correct the placement of the seam edges for proper welding thereof.

Raising and lowering of the press wheels together is accomplished by a threaded jack shaft 181 (FIG. 12) rotating in place into a threaded opening provided therefor in the upper spacer 167. The jack shaft 181 extends through a housing 182 for connection to a handle 183 at the upper end. A locking handle 184 is provided for locking the jack shaft 181 against rotation.

The exterior scarfing tool 137 includes a carbide tip 186 secured to the tool for cutting off excess weld material 187 from the top of the weld 188, and the interior scarfer 138 also comprises a carbide tip for cutting off excess weld material 189 from the under side of the weld.

TUBE WITHDRAWING ASSEMBLY

Figure 13:
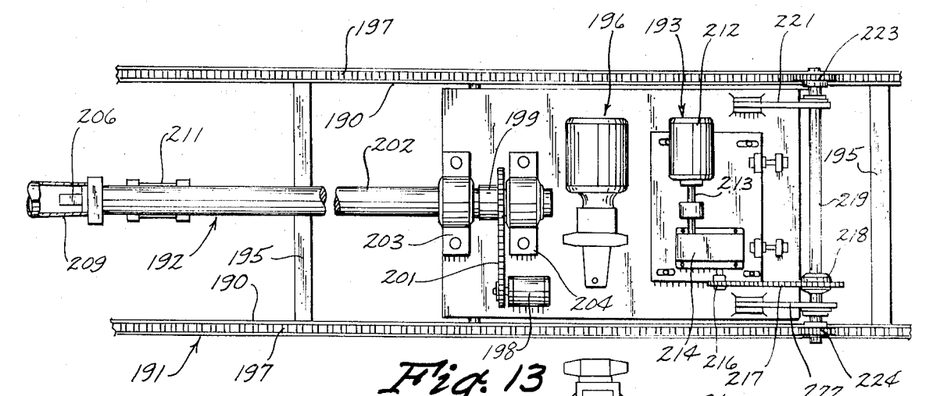
FIG. 13 is an enlarged, fragmentary plan view of the exit cart assembly of this invention.
Figure 14:
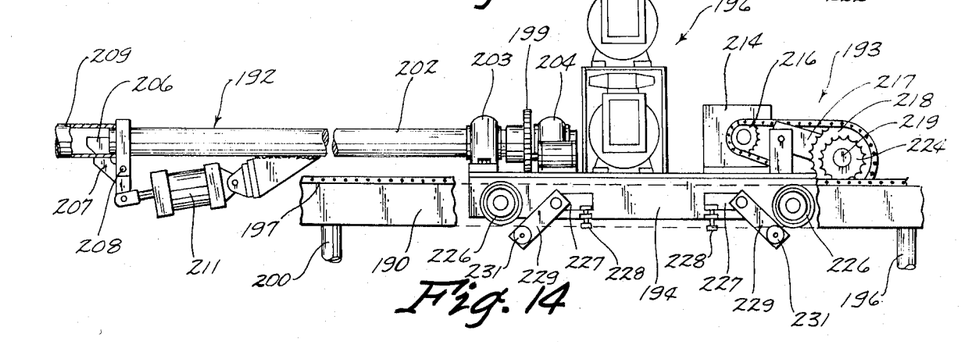
FIG. 14 is a side elevational view of the assembly of FIG. 13.

Referring now to FIGS. 13 and 14 particularly, the tube withdrawing assembly indicated generally at 14 in FIG. 1 is illustrated. It comprises a stationary platform 191, an extracting boom unit 192, a drive unit 193 for reciprocating a cart 194 movably mounted on the platform 191, and a hydraulic unit 196 for supplying the hydraulic elements of the assembly 14.

The platform 191 extends outwardly from the welding assembly 13 or welding station as it is commonly called, in alignment and horizontally level with the input tracks 17, as best illustrated in FIG. 1. A pair of U-shaped, inwardly turned channel beams 190 (FIG. 14) form the track for the outgoing cart 194, which beams are properly braced 200 and supported 196. A chain 197 is secured flat in a straight manner on the upper surface of each beam 190 for providing a drive rack for the cart 194 as seen hereinafter.

The extracting boom unit 192 includes a hydraulic motor 198 which operates a gear reduction unit 199 via a chain 201, and with the unit 199 reversibly rotating an elongated boom 202. A pair of pillow blocks 203 and 204 are provided for mounting the boom 202. A stationary upper clamp 206 is provided at the outer end of the boom 202, and a movable lower clamp 207 is pivoted at 208 on the under side of the boom end. To clamp the finish-weld, forward end 209 of the tube 15, the lower clamp 207 is moved by a hydraulic cylinder unit 211 pivotally mounted on the boom 202.

For driving the cart 194 with it boom 202, capable of applying rotatable torque to the tube 15; the drive unit 193 includes a reversible electric motor 212 operable by a shaft 213, a gear reducer 214, and a sprocket 216 to drive a chain 217 for rotating a torque limiter unit 218 mounted on a driven shaft 219, supported by supports 221 and 222. At the outer end of the shaft 219, a pair of drive sprockets 223 and 224 are adapted to walk back and forth on the stationary chains 197, thus imparting movement to the cart 194 and boom 202.

A quartet of wheels 226 are provided at the corner of the cart 194 for riding within the I-beams 190, and to maintain the cart 194 on the beams, a pair of tighteners are mounted on each side of the cart. Each tightener includes a bar 227 positioned by an adjusting device 228, and with a strap 229 secured thereto for keeping a small roller 231 beneath the lower flange of the respective I-beam.

FEED WHEEL WELDING PRESSURE SYSTEM

Because of the taper of the tube 15 to be welded, the uniformly increasing diameter from the front end 209 (FIG. 1) to the rear end 233, and because of starting and stopping welds at the open ends of the tube 15, the welding pressure applied by the movable wheel 47 against the tube 15 and toward the stationary wheel 48 is changed to suit the requirement at any given point when making the longitudinal weld on the tapered tube 15.

Figure 15:
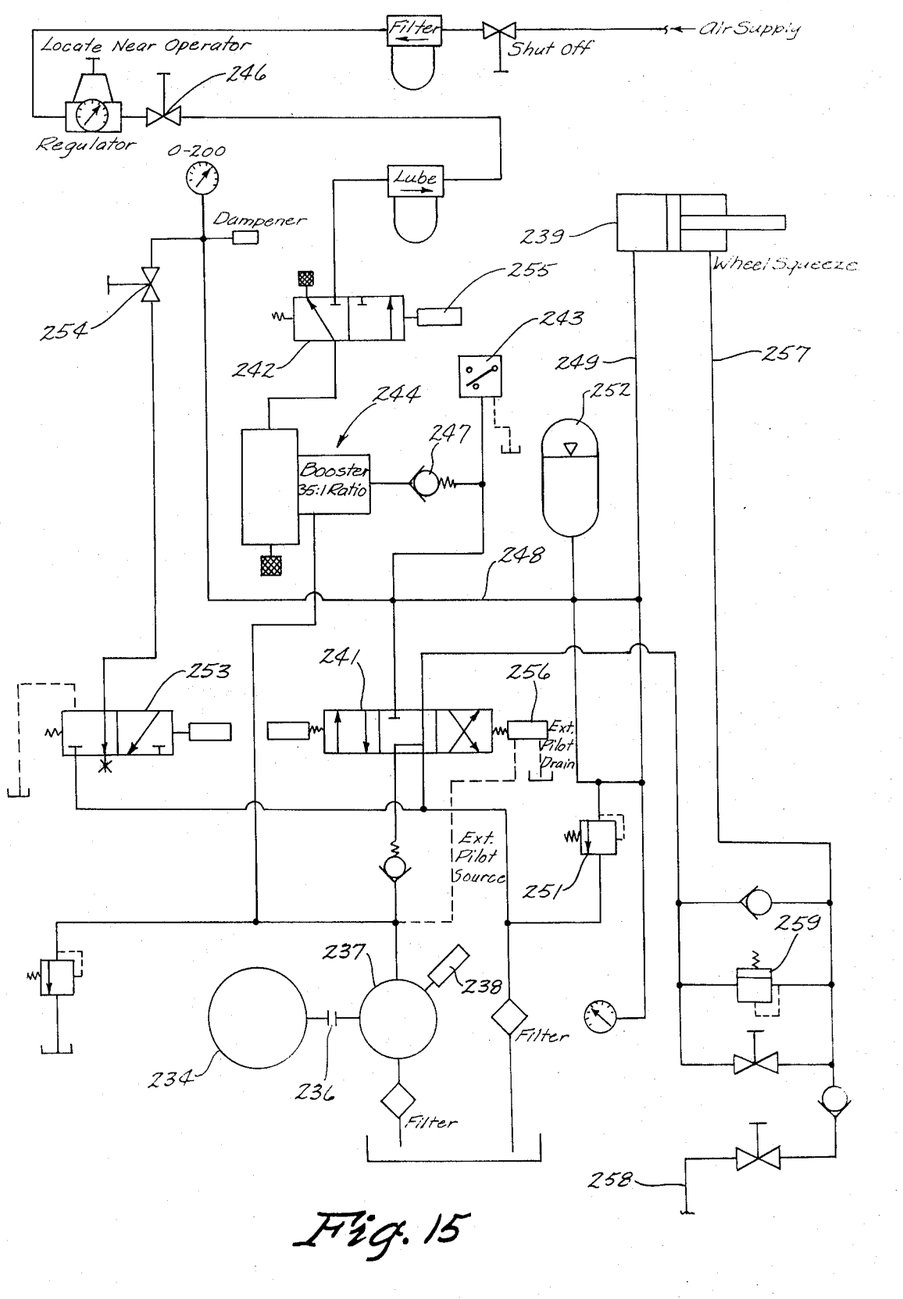
FIG. 15 is a schematic hydraulic diagram of the equipment for one of the feed wheel assemblies of this invention.

Normally a starting or primary pressure is used when starting at the small end 209 of the tube. As the tube diameter increases, the pressure must increase. As the large end of the tube approaches the weld station 13 (FIG. 1), the pressure is reduced or "dumped" to accommodate the normal closing effect of the tube itself. Referring now to FIG. 15, a preferred hydraulic system for accomplishing the foregoing is disclosed.

A motor 234 operating through a coupling 236 operates a variable volume pump 237 to supply primary fluid under pressure to the system at a pressure preselected by the operator of the apparatus 10. Remote selection is available by the provision of a pressure compensator 238 for the pump 237. The fluid is applied to the four cylinders 97 and 107 (FIGS. 3 and 4), represented by the schematic cylinder 239, upon solenoid actuation of a three way valve 241 to move it to the right as illustrated. After weld start, a time delay (not shown) for an air valve 242 is initiated.

The directional control air valve 242 is moved to the left as illustrated, enabling an air-over-oil booster pump 244 to build up the hydraulic pressure in the system. The rate of pressure increase is pre-set by means of a manual choke valve 246. Thus, pressure overcoming a check valve 247 causes fluid to move through lines 248 and 249 to activate the cylinder 239. The pressure will continue to rise until a predetermined maximum is obtained in the system, and which maximum is controlled and maintained during the welding by means of a pressure relief valve 251 connected to the line 248, aided also by an accumulator 252.

When the large end 233 (FIG. 2) approaches the welding station, such that the extreme end is a predetermined distance therefrom, it is detected by a limit switch (not shown), which in turn actuates a time delay relay (not shown), which upon "time-out" opens a directional control valve 253, moving it to the left as viewed, thereby "dumping" or reducing the pressure in the system as the said large end 233 passes through the welding station 13. The rate of pressure reduction is controlled by a needle or "bleed-off" valve 254 in the system, and which is adjustable by the operator.

The accumulator 252 serves a multi-fold function in that during build-up of the pressure it dampens the action of the booster 244, and then during the pressure drop, it delays the bleed-off. A bleed-off occurs when the solenoid 253 is actuated, thus lowering the primary fluid pressure through the rate control valve 254.

Referring to line 257 leading to the right side of the piston in the schematic cylinder 239, a back pressure is maintained therein for better control of the application of pressure. Fluid pressure from another hydraulic system of the apparatus 10 is borrowed through line 258, and by adjusting a pressure relief valve 259, a pressure in the line 257 less than that in line 249 is maintained, whereby the differential actually controls the cylinder 239 and becomes the welding pressure.

With this system, weld pressure requirements can be programmed to meet any needs.

OPERATION

With the movable wheel 47 (FIG. 1) backed off or away from the stationary wheel 48, a tube 15 is placed on the input conveyor 16 and raised to a horizontal position aligned longitudinally with the tracks 17, and with the small end 209 forward or toward the positioning unit 23. The open seam 25 is at the top of the tube due to the center of gravity of the tube being toward the solid bottom thereof.

Figure 11:
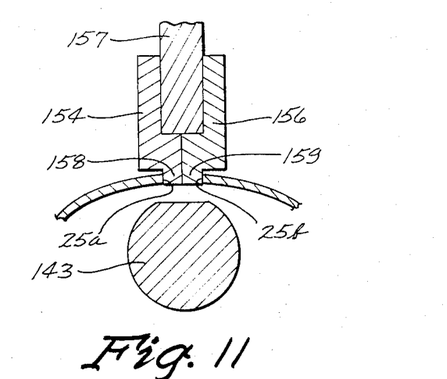
FIG. 11 is an enlarged detailed view taken along the line 11—11 in FIG. 9.

The entry cart 21 is then brought up to the butt end of the tube engaging it and pushing the tube through the positioning unit 23 (FIG. 7), wherein the V-roll 26 and guide roll 29 co-act to align the tube seam 25 for the welding station 13, the card 21 continuing to push the tube 15 until the leading, smaller end 209 enters the area of the welding station 13. There, with the electrodes 161 raised, the tube end 209 passes beneath the slitter bar housing 139 (FIG. 9) with the slitter bar extensions 158 and 159 separating the seam 25 (FIG. 11).

Manipulation of the laterally adjustable wheel 47 (FIG. 1) is made hydraulically, as described hereinbefore, until the seam edges 25a and 25b are properly spaced apart at the press wheels 171 and 172 (FIGS. 9 and 12) and the electrodes 161 are lowered. Operation of the welding machine 13 is then initiated and rotation of the wheel 47 and 48 begins. Due to the gripping nature of the profile plates 68 (FIG. 10), the tube 15 is drawn through the welding station 13 as the weld 188 (FIG. 9) is made.

The exit or withdrawal cart 194 is stationed on its platform track 191 (FIG. 1) closely adjacent the welding station 13, and as soon as the small tube end 209, propelled toward the cart 194 by the wheels 47 and 48, reaches the boom clamps 206 and 207, it is automatically engaged thereby. Thus, continued guidance of the tube 15 through the welding station 13 is not only aided by the positioning control unit 23 (FIG. 7) and the slitter bar unit 133 (FIG. 9), but also by operator control over the boom 202 (FIG. 13). By a visible watch of the open seam 25 at the welding station 13, the operator may rotate the tube 15 by the boom 202 via operation of the torque motor 198 (FIG. 13) so as to maintain the seam 25 in a straight line directly beneath and aligned with the welding electrodes 161 (FIG. 9).

It will be noted that the tube 15 being drawn through the welding station 13 by rotation of the wheels 47 and 48, both the entry cart 21 and the exit cart 194 are free wheeling. As the entry cart 21 nears the positioning control unit 23 (FIG. 1), it initiates a micro-switch (not shown) which causes it to return to its initial position on the input conveyor 16, awaiting another tube 15 to be welded.

The tube 15 being welded is traveling approximately sixty feet per minute, and as its butt end 233 nears the welding station 13 the hydraulic pressure release of the wheel 47 occurs as described herein. With welding complete, withdrawal of the tube 15 is completed by the exit cart 194 until the tube is automatically disengaged from the card 194 and automatically removed from the cart boom unit 192, whereupon the exit cart 194 automatically returns to its initial position close to the welding station 13.

Subsequent to a raising of the electrodes 161 and a slight lateral withdrawal of the wheel 47 from the stationary wheel 48, the apparatus 10 is then ready to receive and weld another tube 15.

Although a preferred embodiment of this invention has been described and illustrated herein, it is to be remembered that various modifications can be made thereto without departing from the true spirit and scope of the invention.

We claim:

1. Apparatus for welding a straight, open seam formed by spaced edges in a tapered tube, comprising:
    means for welding closed said seam;
    a pair of circular, feed members having cooperative peripherally arranged work engaging profiles of progressively varying size rotatably mounted in spaced relation for engaging the tube and feeding it through said welding means; and
    means for horizontally aligning the edges of the tube seam prior to said welding means
    and wherein said horizontal aligning means comprises a pair of wheels arranged in a side-by-side relationship directly above the edges such that each is adapted to engage an edge, one of said wheels movable vertically relative to the other.

2. Apparatus as defined in claim 1, and further wherein one of said feed members is movable toward and away from the other of said members, and including hydraulic means operable on said movable wheel to apply a pressure thereagainst in direct proportion to the diameter of the tube at any point of the applied pressure, said hydraulic means adapted to release said pressure at a predetermined distance of the butt end of the pipe from said welding means.

3. Apparatus for welding a straight, open seam formed by spaced edges in a tapered tube, comprising:
    means for welding closed said seam;
    a pair of circular, feed members having cooperative peripherally arranged work engaging profiles of progressively varying size rotatably mounted in spaced relation for engaging the tube and feeding it through said welding means; and
    means for simultaneously positioning the tube axially of the welding means and arcuately about the tube's longitudinal axis, said means located on the tube input side of the welding means
    and wherein said tube positioning means includes a rotatable V-roll capable of engaging the seam edges and extending into the seam, and an hourglass roll spaced below said V-roll and operable to nest the tube and form a backstop for said V-roll.

4. Apparatus for welding a straight, open seam formed by spaced edges in a tapered tube, comprising:
means for welding closed said seam;
a pair of circular, feed members having cooperative peripherally arranged work engaging profiles of progressively varying size rotatably mounted in spaced relation for engaging the tube and feeding it through said welding means; and
means for engaging the tube as it emerges from the welding means, said engaging means operable to simultaneously rotate the tube about its longitudinal axis and withdraw the tube from the welding means.

5. Apparatus as defined in claim 4 wherein said tube engaging means includes a device for clamping the emerging end, a reversible motor, and means interconnecting the motor with the device for rotating the device in a plane perpendicular to the axial direction of movement of the tube, and including further means for transporting said tube engaging means elements away from the welding means in the direction of movement of the tube.

* * * * *